United States Patent
Thompson et al.

(10) Patent No.: US 7,513,998 B2
(45) Date of Patent: Apr. 7, 2009

(54) "IN-SITU" BALLAST WATER TREATMENT METHOD

(75) Inventors: Claude R. Thompson, Virginia Beach, VA (US); William M. Lechler, Virginia Beach, VA (US); Neil F. Marshall, Williamsburg, VA (US)

(73) Assignee: Sea Knight Corporation, Suffolk, VA (US)

( * ) Notice: Subject to any disclaimer, the term of this patent is extended or adjusted under 35 U.S.C. 154(b) by 0 days.

(21) Appl. No.: 11/712,795

(22) Filed: Mar. 1, 2007

(65) Prior Publication Data
US 2007/0261626 A1 Nov. 15, 2007

Related U.S. Application Data

(60) Provisional application No. 60/798,760, filed on May 9, 2006.

(51) Int. Cl.
*C02F 3/00* (2006.01)

(52) U.S. Cl. .......... 210/603; 210/610; 210/614; 210/620; 210/630

(58) Field of Classification Search ........... 210/603, 210/610, 614, 620, 630
See application file for complete search history.

(56) References Cited

U.S. PATENT DOCUMENTS 6,722,933 B2 * 4/2004 Hunter .............. 114/74 R

* cited by examiner

*Primary Examiner*—Chester T Barry
(74) *Attorney, Agent, or Firm*—Peter J. Van Bergen

(57) ABSTRACT

A method and system for ballast water treatment are provided. A vacuum is applied directly to an existing vent of a vessel's ballast water tank during the vessel's voyage. The applied vacuum is in a range of approximately −2 to −4 pounds per square inch. To further assure success, living organisms can be added into the ballast water tank to consume (i) oxygen dissolved in the ballast water, and (ii) food sources for selected organisms contained in the ballast water. No modifications to the vessel's ballast water tank are required as all system components are coupled to the existing vent.

18 Claims, 2 Drawing Sheets

"IN-SITU" BALLAST WATER TREATMENT METHOD

ORIGIN OF THE INVENTION

Pursuant to 35 U.S.C. §119, the benefit of priority from provisional application 60/798,760, with a filing date of May 9, 2006, is claimed for this non-provisional application.

FIELD OF THE INVENTION

The invention relates generally to the treatment of ballast water, and more particularly to a method and system for treating ballast water "in-situ" in ballast tanks of ocean-going vessels in order to control or eliminate various species of micro-organisms that could be harmful if released into a surrounding environment.

BACKGROUND OF THE INVENTION

Non-indigenous, nuisance and/or harmful species of aquatic micro-organisms are discharged into territorial waters by means of ballast water carried by ships from foreign ports. These micro-organisms are predominantly aerobic organisms that require oxygen throughout their life cycle, (i.e., first as larvae, then as plankton, finally as a mature organism). These aerobic micro-organisms obtain the necessary oxygen from "dissolved" atmospheric air present in the seawater contained in a vessel's ballast tanks. Dissolved air in seawater contains all the constituent gases present in the earth's atmosphere including oxygen that are not chemically bonded to the atomic elements of water. Therefore, the dissolved oxygen in seawater is freely available to sustain aquatic life.

In an effort to eliminate dissolved oxygen in a vessel's ballast water, U.S. Pat. No. 6,722,933 discloses a closed loop system that depressurizes a ballast tank's ullage space while simultaneously introducing oxygen-depleted gas into the ballast water. However, this system requires expensive modifications to the ballast tank.

SUMMARY OF THE INVENTION

Accordingly, it is an object of the present invention to provide a method and system for ballast water treatment.

Another object of the present invention is to provide an "in-situ" ballast water treatment method and system that eliminates harmful and/or nuisance species of aquatic micro-organisms in a vessel's ballast water.

Still another object of the present invention is to provide an effective ballast water treatment method and system that requires no ballast tank modifications.

Other objects and advantages of the present invention will become more obvious hereinafter in the specification and drawings.

In accordance with the present invention, a method of ballast water treatment includes applying a vacuum directly to an existing vent of a vessel's ballast water tank during the vessel's voyage. The applied vacuum is in a range of approximately −2 to −4 pounds per square inch. To further assure success, harmless or beneficial living organisms can be added into the ballast water tank. The living organisms are selected to consume (i) oxygen dissolved in the ballast water, and (ii) food sources for selected unwanted organisms contained in the ballast water. From a hardware perspective, no modifications to a vessel's ballast water tank are required as all system components are coupled to the existing vent(s) of a ballast water tank.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
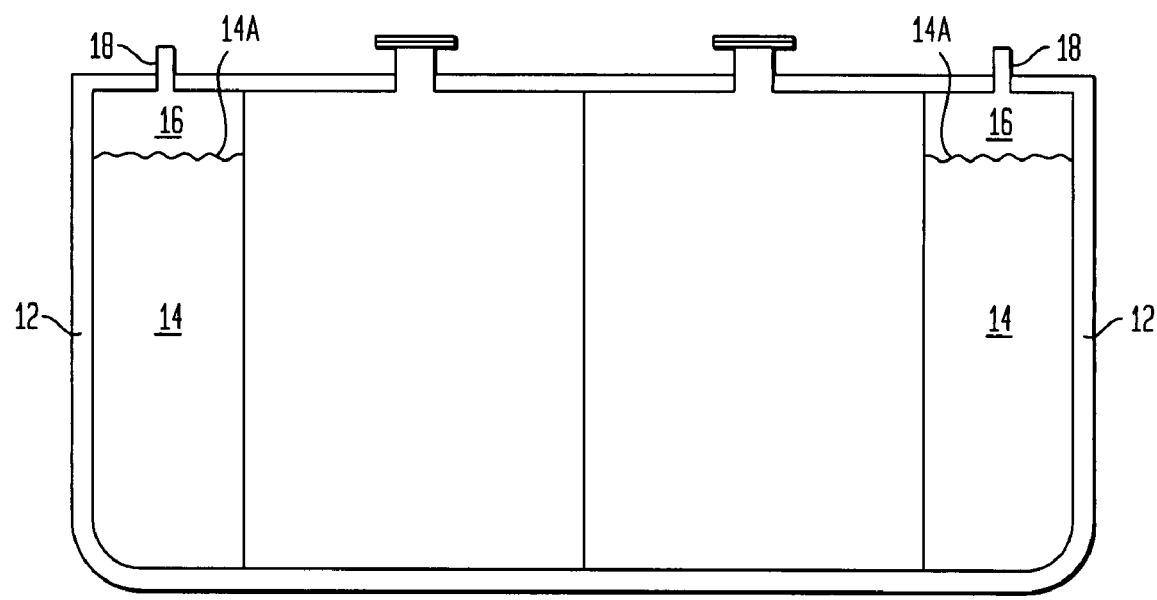
FIG. 1 is a schematic view of a conventional ballast water tank on an ocean-going vessel.

Referring now to the drawings and more particularly to FIG. 1, a portion of an ocean-going vessel 10 (e.g., ship, barge, etc.) is shown. More specifically, the vessel's conventional ballast water tank 12 is shown. The shape and size of ballast water tank 12 are not limitations of the present invention. In addition, the number of such ballast water tanks in vessel 10 is not a limitation of the present invention. The essential features and functions of ballast water tank 12 are well known in the art. Briefly and in general, when vessel 10 is operational, ballast water tank 12 is filled with ballast water 14 to a desired level in tank 12. The air space in ballast water tank 12 above the surface 14A of ballast water 14 is known as ullage space 16. A vent 18 in communication with ullage space 16 allows gases in ullage space 16 to be released into the surrounding atmosphere. It is to be understood that the term "ullage space" as used herein is not limited to the scenario illustrated in FIG. 1. That is, if the ballast water tank is completely filled with ballast water, the ullage space could be defined by the air space in the ballast water tank's vent(s).

The present invention is a system and method for eliminating a variety of harmful/nuisance micro-organisms (not shown) naturally present in ballast water 14. In general, the harmful/nuisance micro-organisms of concern are those that are indigenous to the environment where ballast water 14 originated (i.e., where vessel 10 began its voyage), but non-indigenous to the environment where ballast water 14 will be discharged (i.e., where vessel 10 terminates its voyage). Furthermore, the harmful/nuisance micro-organisms of concern are typically aerobic in nature so that they require the presence of dissolved oxygen in ballast water 14 as well as the presence of other organisms that are food sources. Accordingly, for the remainder of this description, the harmful/nuisance micro-organisms will be referred to as aerobic micro-organisms. The particular aerobic micro-organisms and their food sources will vary depending on the geographic origin of ballast water 14. Further, the level of environmental impact associated with a particular aerobic micro-organism can be related to the geographic region where ballast water 14 will be discharged. Accordingly, the following description of the present invention will not be directed to any particular aerobic micro-organism. Indeed, a great advantage of the present invention is its ability to be adapted to the treatment of any ballast water regardless of its origin.

Figure 2:
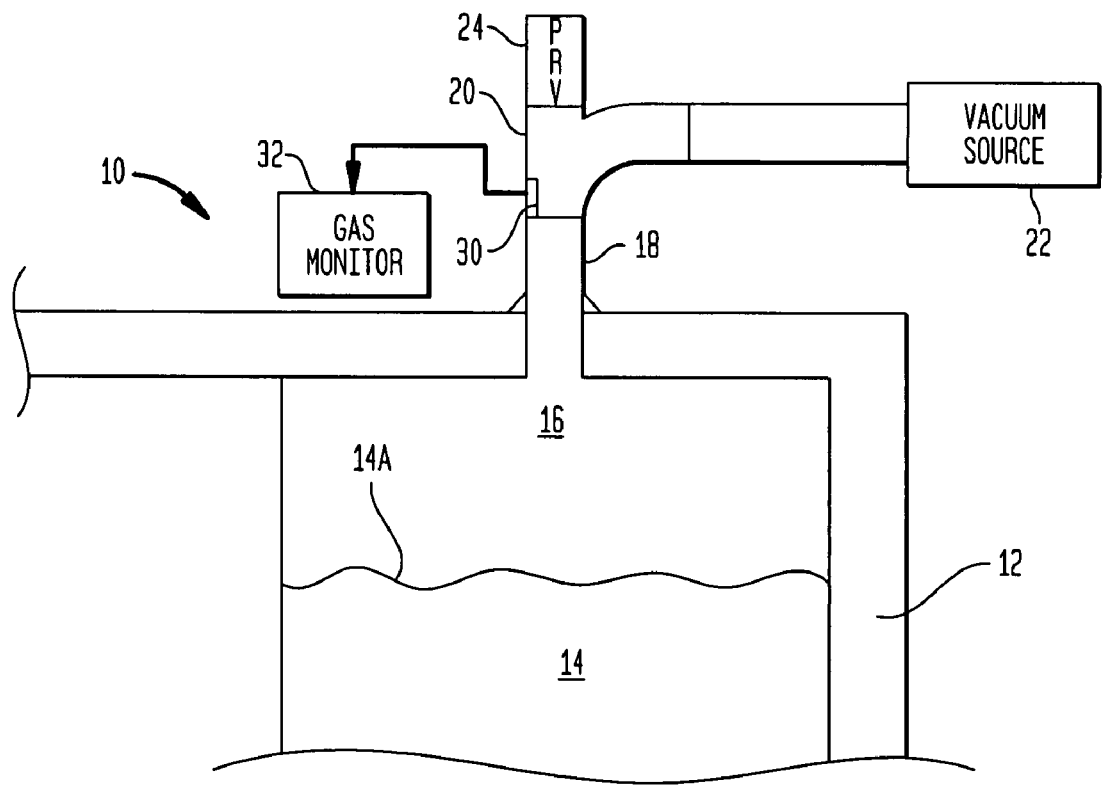
FIG. 2 is a schematic view of a ballast water tank equipped with a ballast water treatment system in accordance with an embodiment of present invention.

Referring now to FIG. 2, an embodiment of an "in-situ" ballast water treatment system of the present invention is shown coupled to ballast water tank 12. In general, the present invention is easily installed on the existing vent 18 of ballast water tank 12. That is, no modifications to ballast water tank 12 are required, while only minimal or no modification to existing vent 18 is required. More specifically, a Y-adapter housing 20 is coupled to the outside or upper end of vent 18. Such coupling can be permanent in fashion (e.g., welded or otherwise adhered) or removable in fashion (e.g., threaded, snap-fit, wedge-fit, etc.) without departing from the scope of the present invention. Housing 20 defines two flow paths therethrough. The first flow path is coupled to a vacuum source 22 that, when activated, will generate a vacuum pressure in vent 18/ullage space 16. The second flow path incorporates a pressure relief valve (i.e., designated as "PRV" in FIG. 2) 24 configured to remain closed up to a specified pressure and then open once that pressure is exceeded.

For purposes of the treatment of ballast water 14, vacuum source 22 and pressure relief valve 24 cooperate to apply a low-level vacuum pressure to vent 18/ullage space 16 during the course of a voyage of vessel 10. The low-level vacuum in the range of approximately −2 to −4 pounds per square inch functions to (i) draw gases out of ullage space 16, and (ii) over extended periods associated with the voyage of vessel 10, draw dissolved oxygen from ballast water 14. As a result, the aerobic micro-organisms typically present in ballast water 14 slowly die as their dissolved oxygen source is reduced or eliminated by the low-level vacuum. By the completion of the voyage of vessel 10, the goal of the present invention is that the depleted-oxygen ballast water 14 is completely or substantially free of the unwanted aerobic micro-organisms. Note that some of the aerobic micro-organisms may be facultative in that they can also exist anaerobically. However, such anaerobic micro-organisms will be killed when the ballast water is discharged into a water environment that is relatively oxygen-rich.

The presence of pressure relief valve 24 regulates the vacuum pressure in vent 18/ullage space 16 as it is set open at a desired vacuum pressure from the afore-mentioned range. The low-level vacuum pressure assured by pressure relief valve 24 also guarantees the structural integrity of ballast water tank 12. Thus, the present invention treats ballast water 14 "in-situ" without requiring any modifications to ballast water tank 12.

The present invention can also include the means to monitor the types of gases present in vent 18/ullage space 16. Accordingly, housing 20 can incorporate one or more sensor(s) 30 sensitive to one or more gases of interest or concern. Sensor(s) 30 would typically be coupled to a gas monitor 32 that can be used to trigger an alarm (e.g., audible, visual, etc.) when the level of the one or more gases being sensed does not meet acceptable criteria.

The method and system of the present invention can be further improved by introducing environmentally-safe living organisms into ballast water 14 that consume oxygen and the food sources of the aerobic micro-organisms in ballast water 14. By removing the aerobic micro-organisms' oxygen and food, the undesirable aerobic micro-organisms will die of suffocation and/or starvation. When the addition of such living organisms is combined with the above-described low-level vacuum, a novel two-pronged "in-situ" approach to ballast water treatment is achieved.

The living organisms that are to be added to the ballast water can be selected to consume oxygen and the aerobic micro-organisms' food sources, and could further be selected to consume the aerobic micro-organisms that have died. The living organisms added to ballast water 14 could be a mix or "cocktail" of different types of living organisms to combat different types of unwanted aerobic micro-organisms in ballast water 14. The particular type(s) of living organisms selected will depend on the type of aerobic micro-organisms present in ballast water 14 as well as the ecosystem in which "treated" ballast water 14 will be discharged. That is, the selected living organisms should be environmentally safe for the ecosystem receiving the discharged/treated ballast water. Such selection would be understood by those skilled in the art and is not a limitation of the present invention.

Figure 3:
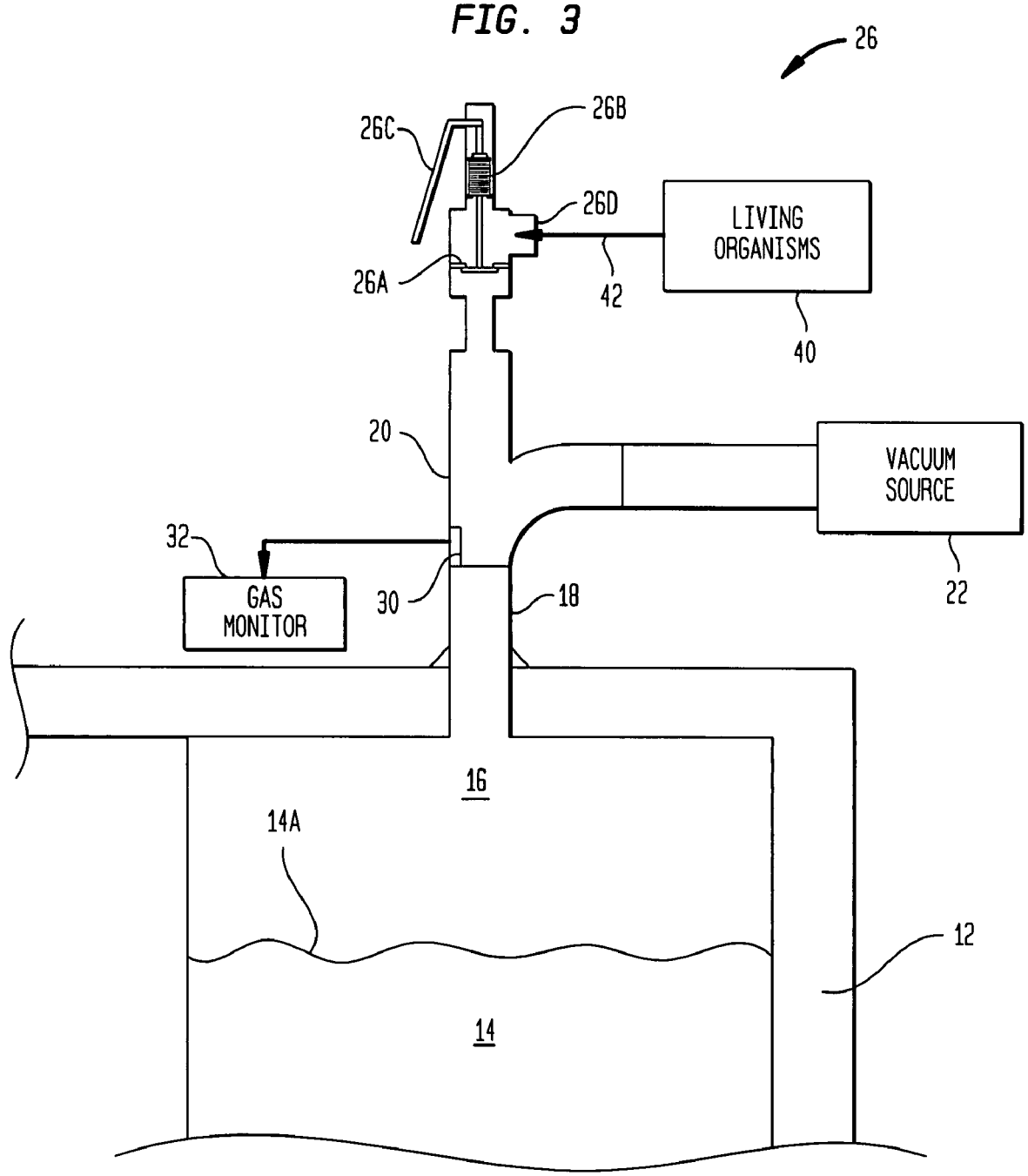
FIG. 3 is a schematic view of a ballast water tank equipped with a ballast water treatment system in accordance with another embodiment of the present invention.

Referring now to FIG. 3, an embodiment of an "in-situ" ballast water treatment system embodying the above-described two-pronged approach is illustrated. The previously-described elements are illustrated, but will not be described again. Also, note that the sensor(s) 30 and gas monitor 32 can be provided as shown, but are not required for the two-pronged water treatment approach.

In FIG. 3, the present invention includes a pressure relief valve 26 that can be opened on demand when vacuum pressure is being applied by vacuum source 20. In the illustrated example, pressure relief valve 26 has a valve seat arrangement 26A, a spring-loaded shaft 26B coupled to seat arrangement 26A, an actuator 26C coupled to shaft 26B, and a valve port 26D formed therein at a location outboard of seat arrangement 26A. In operation, the spring force provided by shaft 26B will be automatically overcome when the vacuum pressure (on the side of seat arrangement 26A facing vent 18) exceeds the desired low-level vacuum pressure. At this point, vent 18/ullage space 16 are vented to the atmosphere via valve port 26D thereby allowing the vacuum pressure in vent 18/ullage space 16 to be decreased in order to maintain and assure the tank's structural integrity.

The opening of pressure relief valve 26 is accomplished by lifting up on actuator 26C to thereby open seat arrangement 26A. The lifting force applied to actuator 26C can be a manually-applied force (i.e., by an on-site operator) or a mechanically-applied force provided by an automated system (not shown). For the purpose of ballast water treatment, the above-described living organisms 40 are added to ballast water 14 via valve port 26D as referenced by arrow 42 when valve 26 is opened. More specifically, while vacuum source 20 is activated, valve 26 is opened. As a result, air at atmospheric pressure will flow through opened seat arrangement 26A, through housing 20/vent 18, and into ullage space 16. When living organisms 40 are added at this time, they will be distributed over the surface 14A of ballast water 14. This will assure wide coverage of the added living organisms over surface 14A and, ultimately, through ballast water 14 as the living organisms sink therein. If needed, distribution diverters or vanes (not shown) can be installed in vent 18 to further assist with the distribution of living organisms 40 over surface 14A. Furthermore, just as an automated system can be used to control the on-demand opening of valve 26, the dispensing of living organisms 40 through valve port 26D could also be automated. Indeed, the opening of valve 26 and simultaneous dispensing of living organisms 40 could be coordinated by a single automated system. In all cases, once the living organisms are added, valve 26 is allowed to close and assume its normal automatic "pressure relief" function.

The oxygen and food-source-consuming living organisms can be added one or more times (as needed) after ballast water 14 is in ballast water tank 12. That is, some applications might only require a one-time addition of the living organisms, while other applications might require multiple or periodic additions of the living organisms. Further, other applications might require different living organisms to be added at different times. Accordingly, the frequency with which the living organisms must be added is not a limitation of the present invention.

The advantages of the present invention are numerous. The ballast water treatment approaches described herein do not require any modifications to a vessel's ballast water tank. No bulky holding or treatment tanks are required as the ballast water is treated "in-situ". All system components are easily coupled to the ballast water tank's existing vent. Thus, the present invention provides a simple, inexpensive and effective ballast water treatment approach that can be readily adopted by the shipping industry.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of ballast water treatment, comprising the step steps of:
    applying a vacuum directly to an existing vent of a vessel's ballast water tank containing ballast water during the vessel's voyage, said vacuum being in a range of approximately -2 to -4 pounds per square inch; and
    adding, during said step of applying, living organisms into the ballast water tank to consume (i) oxygen dissolved in the ballast water, and (ii) food sources for selected organisms contained in the ballast water.

2. A method according to claim 1 wherein said step of applying includes the step of regulating said vacuum.

3. A method according to claim 1 wherein said step of adding comprises the step of adding said living organisms into the ballast water tank via the existing vent.

4. A method according to claim 1 wherein said step of adding is carried out at least one time after the ballast water tank is filled with the ballast water.

5. A method according to claim 1 wherein the selected organisms are aerobic organisms.

6. A method according to claim 1 wherein the living organisms are selected to be harmless to an ecosystem in which the ballast water is to be discharged.

7. A method according to claim 1 further comprising the steps of:
    monitoring a level of at least one gas in the existing vent; and
    generating an alarm signal when said level is indicative of an unacceptable amount of said at least one gas.

8. A method of ballast water treatment, comprising the steps of;
    applying a vacuum directly to an existing vent of a vessel's ballast water tank that contains ballast water, said vacuum being in a range of approximately -2 to -4 pounds per square inch;
    adding living organisms into the ballast water tank to consume (i) oxygen dissolved in the ballast water, and (ii) food sources for selected organisms contained in the ballast water;
    monitoring a level of at least one gas in the existing vent; and
    generating an alarm signal when said level is indicative of an unacceptable amount of said at least one gas.

9. A method according to claim 8 wherein said step of applying includes the step of regulating said vacuum.

10. A method according to claim 8 wherein said step of adding comprises the step of adding said living organisms into the ballast water tank via the existing vent.

11. A method according to claim 8 wherein said step of adding is carried out during said step of applying.

12. A method according to claim 8 wherein said step at adding is carried out at least one time after the ballast water tank is filled with the ballast water.

13. A method according to claim 8 wherein the selected organisms are aerobic organisms.

14. A method according to claim 8 wherein the living organisms are selected to be harmless to an ecosystem in which the ballast water is to be discharged.

15. A method of ballast water treatment, comprising the steps of:
    providing a pressure relief valve in an existing vent of a vessel's ballast water tank that contains ballast water wherein a ullage space is defined between the existing vent and the surface of the ballast water, said pressure relief valve (i) automatically opening when a vacuum pressure in the ullage space exceeds a value selected from the range of approximately -2 to -4pounds per square inch, and (ii) being configured to be opened on demand;
    applying a vacuum directly to the existing vent at a position between said pressure relief valve and the surface of the ballast water wherein said vacuum acts on the ullage space; and
    adding living organisms into the ballast water tank through said pressure relief valve as (i) said pressure relief valve is opened on demand, and (ii) said vacuum is applied to the existing vent, said living organisms consuming (i) oxygen dissolved in the ballast water, and (ii) food sources for selected organisms contained in the ballast water.

16. A method according to claim 15 further comprising the steps of:
    monitoring a level of at least one gas between said pressure relief valve and the surface of the ballast water; and
    generating an alarm signal when said level is indicative of an unacceptable amount of said at least one gas.

17. A method according to claim 15 wherein the selected organisms are aerobic organisms.

18. A method according to claim 15 wherein the living organisms are selected to be harmless to an ecosystem in which the ballast water is to be discharged.

* * * * *